United States Patent
Xiong et al.

(10) Patent No.: US 9,973,106 B2
(45) Date of Patent: May 15, 2018

(54) WIDE RANGE AC/DC CONVERTER CIRCUIT

(71) Applicant: EATON CORPORATION, Cleveland, OH (US)

(72) Inventors: Tom Xiong, Shanghai (CN); Kevin Zhong, Shanghai (CN)

(73) Assignee: EATON INTELLIGENT POWER LIMITED, Dublin 4 (IE)

( * ) Notice: Subject to any disclaimer, the term of this patent is extended or adjusted under 35 U.S.C. 154(b) by 0 days. days.

(21) Appl. No.: 15/249,709

(22) Filed: Aug. 29, 2016

(65) Prior Publication Data
US 2018/0062534 A1    Mar. 1, 2018

(51) Int. Cl.
*H02M 3/335*    (2006.01)
*H02M 7/06*    (2006.01)
*H02M 7/217*    (2006.01)

(52) U.S. Cl.
CPC ......... *H02M 7/06* (2013.01); *H02M 3/33592* (2013.01); *H02M 7/217* (2013.01)

(58) Field of Classification Search
None
See application file for complete search history.

(56) References Cited

U.S. PATENT DOCUMENTS

| | | | | |
|---|---|---|---|---|
| 5,581,131 A | * | 12/1996 | Urushiwara | F02P 3/051 123/630 |
| 5,898,584 A | * | 4/1999 | Feng | H02M 5/293 363/125 |
| 2003/0165037 A1 | * | 9/2003 | Liscinksy | H02H 3/253 361/78 |
| 2014/0239829 A1 | * | 8/2014 | Zhang | H05B 33/0815 315/200 R |
| 2015/0124499 A1 | * | 5/2015 | Eum | H02M 3/335 363/50 |
| 2015/0257211 A1 | * | 9/2015 | Johnson | H05B 33/089 315/121 |

\* cited by examiner

*Primary Examiner* — Jeffrey Gblende
(74) *Attorney, Agent, or Firm* — Eckert Seamans

(57) ABSTRACT

An electric circuit for use with an AC power source includes a diode electrically connected to a line input from the AC power source, a transistor having a gate, a drain, and a source, wherein the drain is electrically connected to the diode, a zener diode electrically connected between the gate and the source of the transistor, a resistor electrically connected between the drain of the transistor and a neutral input from the AC power source, and a capacitor electrically connected in parallel with the resistor.

13 Claims, 1 Drawing Sheet

WIDE RANGE AC/DC CONVERTER CIRCUIT

BACKGROUND

Field

The disclosed concept pertains generally to power converters and, more particularly, to AC/DC converter circuits.

Background Information

A common type of AC/DC converter is a switching power supply. Known switching power supplies convert 100-240 Vrms AC power to a corresponding DC power having a DC voltage of, for example, 24 V. Switching power supplies are popular in part because they are efficient. That is, there is relatively little power lost in the conversion from AC to DC.

A drawback of a 100-240 Vrms switching power supply is that its maximum input voltage is limited to 240 Vrms AC power. In some countries, higher voltage power is used so a 100-240 Vrms switching power supply cannot be used. By way of one non-limiting example, in Canada, some power is supplied at 347 Vrms. While some other types of AC/DC converters exist, most only support an AC input voltage somewhere in the range of 85 Vrms to 265 Vrms, which still falls short of the 347 Vrms AC power used in Canada.

Another issue with switching power supplies is that they include many components, which can increase their cost. It would be desirable to reduce the amount of components in an AC/DC converter while still providing stable DC output voltage.

There is thus room for improvement in AC/DC converter circuits.

SUMMARY

This need and others are met by embodiments of the disclosed concept in which an AC/DC converter circuit is capable of converting an AC input voltage above 265 Vrms into a stable DC output voltage.

In accordance with aspects of the disclosed concept, an electric circuit for use with an AC power source comprises: a diode electrically connected to a line input from the AC power source; a transistor having a gate, a drain, and a source, wherein the drain is electrically connected to the diode; a zener diode electrically connected between the gate and the source of the transistor; a resistor electrically connected between the drain of the transistor and a neutral input from the AC power source; and a capacitor electrically connected in parallel with the resistor.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, AC voltage values are provided as root mean square voltages (Vrms) unless otherwise specified. An AC peak voltage (Vpeak) is about equal to 1.414× Vrms.

Figure 1:
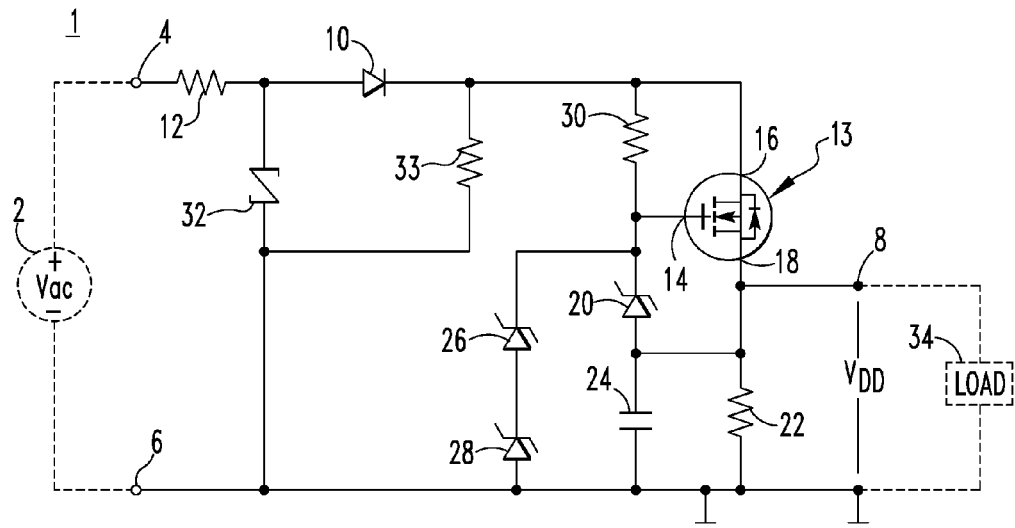
FIG. 1 is a circuit diagram of an AC/DC converter circuit in accordance with an example embodiment of the disclosed concept.

FIG. 1 is a circuit diagram of an AC/DC converter circuit 1 in accordance with an example embodiment of the disclosed concept. The AC/DC converter circuit 1 is structured to receive an AC input voltage Vac from a power source 2 via a line input 4 and a neutral input 6. The AC/DC converter circuit 1 is further structured to converter the AC input voltage Vac into a DC output voltage VDD at an output point 8. In some example embodiments, there may be no isolation between the line and neutral inputs 4,6 and the power source 2.

The AC/DC converter circuit 1 includes a diode 10 electrically coupled to the line input 4. In some example embodiments an input resistor 12 may be electrically connected between an anode of the diode 10 and the line input 4. The input resistor 12 may have a relatively low resistance such as, for example and without limitation, about 200Ω. The diode 10 may be any suitable type of diode. In some example embodiments of the disclosed concept, the diode 10 has a peak reverse voltage that is greater than the input voltage Vac. For example and without limitation, in some example embodiments of the disclosed concept, the input voltage Vac is about 365 Vrms and the diode 10 may have a peak reverse voltage of about 1000 V and a peak forward surge current of about 1 A.

The AC/DC converter circuit 1 also includes a transistor 13. The transistor 13 may include a gate 14, a drain 16, and a source 18. The drain 16 of the transistor 13 is electrically connected to the cathode of the diode 10. In some example embodiments, the transistor 13 may be a metal oxide semiconductor field effect transistor (MOSFET). Also, in some example embodiments, the transistor 13 may be an n-channel MOSFET. For example and without limitation, a power transistor model IPD60R950C6 (manufactured and distributed by Infineon Technologies AG of Neubiberg, Germany) or other similar suitable transistors may be employed as the transistor 13 without departing from the scope of the disclosed concept.

In some example embodiments of the disclosed concept, the transistor 13 may have a gate-source voltage (Vgs) of 15 V or higher. Additionally, in some embodiments of the disclosed concept, the transistor 13 may have a relatively low drain-source resistance (Rds). Furthermore, in some embodiments of the disclosed concept, the transistor 13 may have a drain-source voltage (Vds) of at least 500 V. In some embodiments of the disclosed concept, the transistor 13 may have a total power dissipation (Ptot) of 10 W.

The AC/DC converter circuit 1 further includes a zener diode 20. The zener diode 20 is electrically connected between the gate 14 of the transistor 13 and the source 18 of the transistor 13. In more detail, a cathode of the zener diode 20 is electrically connected to the gate 14 of the transistor 13 and an anode of the zener diode 20 is electrically connected to the source 18 of the transistor 13. Additionally, the anode of the zener diode 20 and the source 18 of the transistor are electrically connected the output point 8. Any suitable zener diode 20 may be employed as the zener diode 20. In some example embodiments of the disclosed concept, the zener diode 20 has a breakdown voltage (sometimes also referred to as a zener voltage) of about 12 V.

The AC/DC converter circuit 1 additionally includes an output resistor 22 and an output capacitor 24. The output resistor 22 and the output capacitor 24 are electrically connected in parallel between the output point 8 (as well as the source 18 of the transistor 18) and the neutral input 6. A voltage across the output resistor 22 and the output capacitor 24 is equivalent to the DC output voltage VDD. The output capacitor 24 helps to smooth and provide a stable DC output voltage VDD. Any suitable resistor and capacitor may be employed as the output resistor 22 and output capacitor 24. In some example embodiments of the disclosed concept, the output resistor 22 has a resistance of about 2 Ma Additionally, in some example embodiments of the disclosed concept, the output capacitor 24 has a capacitance of about 4.7 μF. However, is will be appreciated by those having ordinary skill in the art that different resistance and capacitance values may be employed without departing from the scope of the disclosed concept.

In addition to the zener diode 20, the AC/DC converter circuit 1 may include one or more second zener diodes 26,28 electrically connected in series between the gate 14 of the transistor 13 and the neutral input 6. In some example embodiments, two second zener diodes 26,28 are electrically connected in series such that their cathodes face the gate 14 of the transistor 13 and their anodes face the neutral input 6. The DC output voltage VDD is about equal to the sum of the breakdown voltages of the second zener diodes 26,28 minus the breakdown voltage of the zener diode 20. For example and without limitation, in some embodiments of the disclosed concept, the sum of the breakdown voltages of the second zener diodes 26,28 is about 191 V (e.g., one second zener diode 26 diode has a breakdown voltage of about 100 V and the other second zener diode 28 has a breakdown voltage of about 91 V) and the breakdown voltage of the zener diode is 12 V, making the DC output voltage VDD about equal to 179 V.

The AC/DC converter circuit 1 may further include a second resistor 30. In some example embodiments, the second resistor 30 is electrically connected between the cathode of the diode 10 and the gate 14 of the transistor 13. The second resistor 30 may have a resistance about equal to the resistance of the output resistor 22 (e.g., without limitation, about 2 MΩ).

Shortly after a zero-crossing and entering a positive half-cycle of the AC input voltage Vac, a positive voltage is applied between the gate 14 and source 18 of the transistor 13. The positive voltage turns on the transistor 13 and allows current to flow from the drain 16 to the source 18 of the transistor 13. Shortly after turning on, the transistor 13 turns off and remains off through the negative half-cycle of the AC input voltage Vac.

The AC/DC converter circuit 1 additionally includes a metal oxide varistor (MOV) 32 and a third resistor 33. The MOV 32 is electrically connected between the anode of the diode 10 and the neutral input 6. The third resistor 33 is electrically connected between the cathode of the diode 10 and the neutral input 6. In some example embodiments of the disclosed concept, the MOV 32 is capable of passing a 6 kV, 3 kA combination waveform surge test such as that provided according to UL 1449.

A load 34 may be electrically connected to the output point 34 such that the DC output voltage VDD is applied to the load 34. Table 1 shows the relationship between the AC input voltage Vac and DC output voltage VDD when no load is electrically connected to the output point 8, when a 33 kΩ load is electrically connected to the output point 8, and when a 16 kΩ load is electrically connected to the output point 8.

TABLE 1

| No Load Condition | | 33 kΩ Load | | 16 kΩ Load | |
|---|---|---|---|---|---|
| Input (Vac) | Output (VDD) | Input (Vac) | Output (VDD) | Input (Vac) | Output (VDD) |
| 100 | 131 | 100 | 119 | 100 | 111.2 |
| 120 | 161 | 120 | 142.6 | 120 | 133.2 |
| 140 | 183 | 140 | 167 | 140 | 156 |
| 160 | 183.7 | 160 | 175.3 | 160 | 167.8 |
| 180 | 183.8 | 200 | 176.7 | 180 | 169.5 |
| 200 | 183.8 | 220 | 177.2 | 200 | 170.7 |
| 220 | 183.8 | 240 | 177.6 | 220 | 171.4 |
| 240 | 183.9 | 260 | 177.9 | 240 | 171.7 |
| 260 | 184 | 280 | 178 | 260 | 172.3 |
| 280 | 184 | 300 | 178.4 | 280 | 173 |
| 300 | 184 | 320 | 178.6 | 300 | 173.4 |
| 320 | 183.9 | 347 | 178.8 | 320 | 173.6 |
| 347 | 183.9 | 400 | 179 | 347 | 174 |
| 360 | 183.9 | 420 | 179.2 | 380 | 174.5 |
| 380 | 183.9 | | | 400 | 174.9 |
| 420 | 183.9 | | | 420 | 175.1 |

As shown in Table 1, changing the load 34 has a relatively minor impact on the relation between the AC input voltage Vac and the DC output voltage VDD. Additionally, as shown in Table 1, the DC output voltage VDD is clamped at about 180 V. The clamping is provided by the zener diodes 20,26,28. The AC/DC converter circuit 1 provides a stable DC output voltage VDD of about 180 V for AC input voltage above about 265 Vrms.

Figure 2:
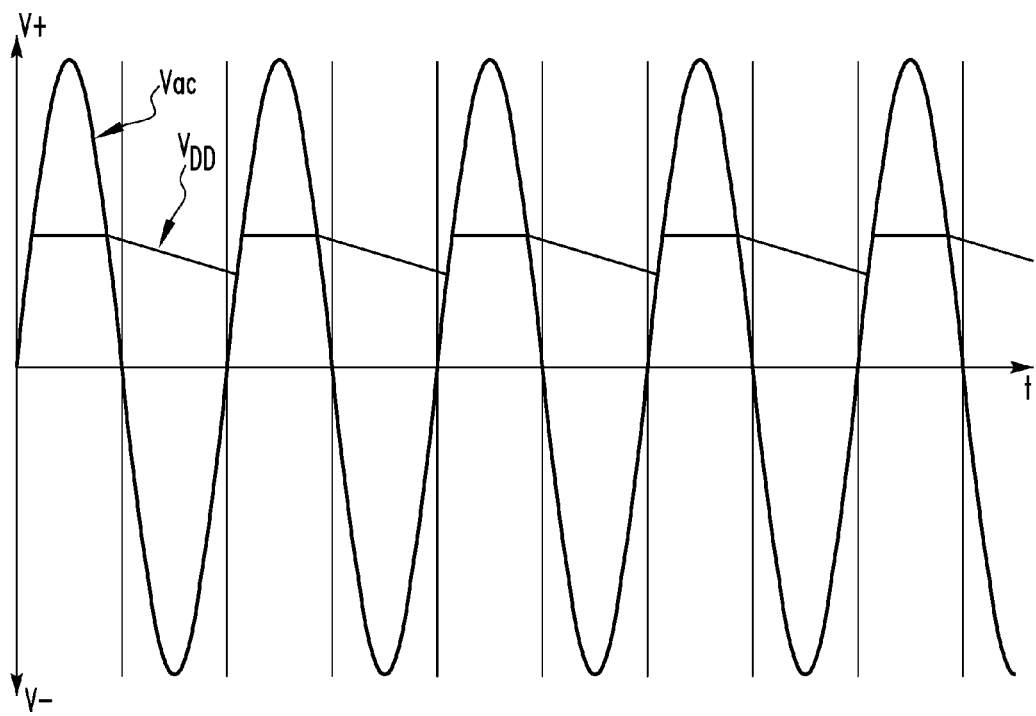
FIG. 2 is a graph showing an example of an AC input voltage and a DC output voltage for the AC/DC converter circuit of FIG. 1.

FIG. 2 is a graph of the AC input voltage Vac and the DC output voltage VDD over a period of time. As shown in FIG. 2, during the positive half-cycle of the AC input voltage Vac, the DC output voltage VDD rises with it until the AC input voltage Vac and DC output voltage reach the clipping point of the DC output voltage VDD. The clipping point of the DC output voltage VDD is about equal to the sum of the breakdown voltages of the second zener diodes 26,28 minus the breakdown voltage of the zener diode 20. During the second half of the positive half-cycle of the AC input voltage Vac, the DC output voltage VDD remains at about the clipping point.

When the AC input voltage Vac falls below the clipping point, the DC output voltage VDD begins to slowly decrease. Discharge of the capacitor 24 helps to maintain the DC output voltage VDD near the clipping point. The DC output voltage VDD continues to slowly decrease through the negative half-cycle of the AC input voltage Vac. In the next positive half-cycle, when the AC input voltage Vac reaches the point where it is equal to the DC output voltage VDD, the DC output voltage VDD increases in conjunction with the AC input voltage Vac until it reaches the clipping point. The cycle of staying at the clipping point, slowly decreasing, and then increasing to the clipping point again is continuously repeated for the DC output voltage VDD resulting in the DC output voltage VDD having a rippled waveform which is sufficiently stable to be employed as a DC voltage.

In some example embodiments of the disclosed concept, the AC input voltage Vac is about 347 Vrms and the DC output voltage VDD is about 180 V. However, it is contemplated that the AC/DC converter circuit 1 may be employed with a variety of AC input voltages Vac. For example and without limitation, the AC/DC converter circuit 1 of FIG. 1 may be employed with AC input voltages Vac in a range of about 100-400 Vrms and the corresponding DC output voltages VDD would be in a range of about 110-180 V. However, it is contemplated that values of components in the AC/DC converter circuit 1 may be adjusted without departing from the scope of the disclosed concept. For example and without limitation, the breakdown voltages of the second zener diodes 26,28 may be adjusted to clamp the DC output voltage VDD at a different level. As another example, additional second zener diodes 26,28 may be added to clamp the DC output voltage at a different level.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electric circuit for use with an AC power source, the electric circuit comprising:
    a diode electrically connected to a line input from the AC power source;
    a transistor having a gate, a drain, and a source, wherein the drain is electrically connected to the diode;
    a zener diode electrically connected between the gate and the source of the transistor and having a cathode connected to the gate;
    a resistor electrically connected between the source of the transistor and a neutral input from the AC power source;
    a capacitor electrically connected in parallel with the resistor; and
    at least two second zener diodes electrically connected between the gate and the neutral input and having cathodes at least one of the at least two second zener diodes having a cathode connected to the gate,
    wherein a voltage across the resistor is a direct current voltage having a value equal to a sum of breakdown voltages of the second zener diodes minus a breakdown voltage of the zener diode.

2. The electric circuit of claim 1, wherein a cathode of the zener diode is electrically connected to the gate and an anode of the zener diode is electrically connected to the capacitor and the resistor.

3. The electric circuit of claim 1, wherein the at least two second zener diodes are two second zener diodes electrically connected in series between the gate and the neutral input.

4. The electric circuit of claim 3, wherein a breakdown voltage of the zener diode is 12V.

5. The electric circuit of claim 3, wherein a sum of breakdown voltages of the second zener diodes is 191V.

6. The electric circuit of claim 1, further comprising:
    a second resistor electrically connected between the diode and the gate of the transistor.

7. The electric circuit of claim 6, wherein a resistance of the resistor is equal to a resistance of the second resistor.

8. The electric circuit of claim 1, further comprising:
    a metal oxide varistor (MOV) electrically connected between the line and the neutral; and
    a third resistor electrically connected between a cathode of the diode and the MOV.

9. The electric circuit of claim 1, wherein the transistor is a metal oxide semiconductor field effect transistor (MOSFET).

10. The electric circuit of claim 1, wherein the capacitor has a capacitance of 4.7 uF.

11. The electric circuit of claim 1, wherein the transistor is structured to turn on when an input voltage between the line input and neutral input begins a positive half-cycle.

12. The electric circuit of claim 1, wherein a voltage across the resistor is 180V when an input voltage between the line and neutral is 365 Vrms.

13. The electric circuit of claim 1, wherein there is no isolation between the AC power source and the line and neutral inputs.

* * * * *